(12) United States Patent
Karabey et al.

(10) Patent No.: US 11,924,250 B2
(45) Date of Patent: Mar. 5, 2024

(54) AUTOMATED CONTEXTUAL UNDERSTANDING OF UNSTRUCTURED SECURITY DOCUMENTS

(71) Applicant: MICROSOFT TECHNOLOGY LICENSING, LLC, Redmond, WA (US)

(72) Inventors: Bugra Karabey, Redmond, WA (US); Muhammad Ali Siddiqui, Redmond, WA (US); Jing Han Shiau, Redmond, WA (US); Meenal Srivastva, Redmond, WA (US); Subramanian Nagarajan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 287 days.

(21) Appl. No.: 17/236,942

(22) Filed: Apr. 21, 2021

(65) Prior Publication Data
US 2022/0345489 A1    Oct. 27, 2022

(51) Int. Cl.
*H04L 9/40* (2022.01)
*G06F 40/30* (2020.01)
*G06N 20/00* (2019.01)

(52) U.S. Cl.
CPC .............. *H04L 63/20* (2013.01); *G06F 40/30* (2020.01); *G06N 20/00* (2019.01)

(58) Field of Classification Search
CPC .......... H04L 63/20; G06N 20/00; G06F 40/30
See application file for complete search history.

(56) References Cited

U.S. PATENT DOCUMENTS

| | | | |
|---|---|---|---|
| 11,158,204 B2 * | 10/2021 | Harlow | .................... G06N 7/01 |
| 2013/0055399 A1 | 2/2013 | Zaitsev et al. | |
| 2017/0366440 A1 * | 12/2017 | Sheleheda | ........... H04L 41/0613 |

(Continued)

OTHER PUBLICATIONS

"International Search Report and Written Opinion Issued in PCT application No. PCT/US2022/023190", dated Jun. 2, 2022, 13 Pages.

*Primary Examiner* — Matthew Smithers
*Assistant Examiner* — Shu Chun Gao
(74) *Attorney, Agent, or Firm* — Newport IP, LLC; Jacob P. Rohwer (57) ABSTRACT

Disclosed herein is a system for minimizing the amount of time it takes to process and understand an unstructured, text-heavy document that includes important security-related information. The system uses a model that implements natural language processing techniques to semantically analyze an unstructured, text-heavy document, in order to identify notable security features useable to resolve the security issues in a more effective and efficient manner (e.g., without the need for a technical security professional). More specifically, the system receives an unstructured document that includes text which may be provided by multiple different security providers. The system is configured to apply the model to various text segments (e.g., a phrase, a sentence, a paragraph, etc.) included in the unstructured document to identify notable security features. The model can then associate the notable security features with a prescribed set of mitigation actions that can be implemented to resolve a security issue.

17 Claims, 7 Drawing Sheets

(56) References Cited

U.S. PATENT DOCUMENTS

| | | | | |
|---|---|---|---|---|
| 2018/0089328 | A1* | 3/2018 | Bath | G06F 16/9538 |
| 2019/0034828 | A1* | 1/2019 | Cagadas | H04L 51/02 |
| 2020/0112590 | A1* | 4/2020 | Bhatia | G06F 40/30 |
| 2020/0322361 | A1* | 10/2020 | Ravindra | G06F 16/2477 |
| 2020/0336505 | A1* | 10/2020 | Neuvirth | H04L 41/0631 |
| 2020/0410001 | A1* | 12/2020 | Sarkissian | G06F 3/0482 |
| 2022/0092095 | A1* | 3/2022 | Shukla | G06F 16/334 |
| 2022/0148113 | A1* | 5/2022 | Mejia | G06Q 50/265 |
| 2022/0253787 | A1* | 8/2022 | Kochura | G06N 3/08 |
| 2022/0292186 | A1* | 9/2022 | Givental | G06F 21/554 |

\* cited by examiner

AUTOMATED CONTEXTUAL UNDERSTANDING OF UNSTRUCTURED SECURITY DOCUMENTS

BACKGROUND

Security is an important aspect for platforms that offer network services. As cloud computing gains popularity, more and more sensitive data and/or services are stored and provided online. Consequently, computer security has become more crucial than ever before. Service providers are especially interested in keeping resources safe to help protect their clients' assets and to avoid legal liability.

In many scenarios, an entity that operates a cloud-based platform implements certain risk management and/or Governance, Risk & Compliance (GRC) systems that summarize and/or present security related data in a static manner. The security related data may be associated with a set of resources that are managed and/or used by a customer of the cloud-based platform. The static manner in which this data is presented typically includes an unstructured, text-heavy document that is difficult for the average user to comprehend and understand, in no small part because different security providers contribute input to the document.

As an illustrative example, one of these documents that summarizes and/or presents data from multiple different security providers can include twenty or thirty pages of text that bury more important pieces of security information (e.g., vulnerabilities, resource names, patches needed, supplier names, updates needed, etc.) in a large amount of text. The more important pieces of security information often relate to a larger security issue. To fully understand and comprehend this larger security issue, a customer that receives one of these unstructured, text-heavy documents typically needs to employ a high paid technical security professional to spend a considerable amount of time reviewing the twenty or thirty pages of text. In many cases, this can take hours or even days, and by the time the more important pieces of information are identified and understood by a technical security professional, a cyber attacker could have already inflicted some major consequences (e.g., sensitive data for thousands or millions of accounts may have been illegitimately accessed and exposed).

It is with respect to these and other considerations that the disclosure made herein is presented.

SUMMARY

The techniques disclosed herein enable systems to bridge the gap between a first time when an unstructured, text-heavy document is received and a second time when actions to mitigate one or more security issues surfaced in the document are started and/or completed. As described above, this time gap if often too long because a technical security professional is required to manually analyze, at a large cost, all the text in an unstructured document in order to take away key insights and to devise a mitigation plan to resolve a security issue. The techniques described herein bridge the time gap by utilizing a trained model that implements natural language processing techniques. The model semantically analyzes an unstructured, text-heavy document, in order to identify notable security features useable to resolve the security issues in a more effective and efficient manner (e.g., without the need for a technical security professional).

The notable security features can include key insights (e.g., a type of security issue), provider intents and recommendations (e.g., a mitigation action), identifications and/or locations of resources affected by the security issues (e.g., a specific resource, a domain or division of resources in which the security issue occurs, etc.), identifications and/or locations of resources that need to be reconfigured (e.g., updated, modified, etc.) to implement a mitigation plan, identifications and/or locations of entities capable of implementing a mitigation action as part of a mitigation plan, and so forth. As described above, an unstructured, text-heavy document typically includes a large amount of text describing, in great detail, security information associated with a set of resources, also referred to as "assets". For instance, the unstructured, text-heavy document can include a security finding, an audit, a vulnerability advisory, a threat intelligence report, a risk register, and/or an exception repository. While the amount of text included in one of these documents is large (e.g., upwards of twenty to thirty pages), the notable security features to "take away" from the document are typically limited. That is, in most instances, one tasked with resolving a security issue should take away somewhere between five and fifteen notable security features. However, some documents may include more or less notable security features that should be understood.

To further complicate matters, this text can be provided by multiple different security providers responsible for monitoring and protecting the set of resources. A resource can include a server, a storage device, a user device (e.g., a personal computer, a tablet computer, a smartphone, etc.), a virtual machine, a virtual network, networking equipment, accounts, etc. Accordingly, a resource can be a physical resource or a virtual resource. Furthermore, a resource may be one that is under control of an entity operating a cloud-based platform that provides a service, or the resource may be one that is configured to be monitored by a security operations center of a cloud-based platform (e.g., an on-premises device). Consequently, the resource may be a customer-controlled resource or a service provider-controlled resource.

In various examples, different security providers can provide contextual input to an unstructured document based on an alert. An alert means that an event has been detected. For instance, an event may expose a resource or make the resource susceptible to a problem, and therefore, further investigation may be warranted. An alert can be generated automatically by a monitoring system, such as anti-malware software, or other detection mechanisms configured by different security providers of the cloud-based platform. In another example, an alert can be generated from external customer reports submitted through a customer portal configured within the cloud-based platform. Alternatively, different security providers can provide contextual input to an unstructured document in accordance with a schedule. In a specific example, a security provider can generate and issue a security audit report based on its findings every day, every week, every month, and so forth.

Generally, a security provider can generate information, to be included in an unstructured document, that describes various alerts by way of manual or automated text descriptions. These text descriptions can include notable pieces of information related to a broader security issue. For example, notable pieces of information can be revealed via the use of keywords and/or key phrases. A non-exhaustive list of such information can indicate vulnerabilities, resource names, patches needed, supplier names, updates needed, etc. A broader security issue can be related to distributed denial of service (DDoS) attacks, the installation of malware, brute force attacks, phishing campaigns, or other types of security-related "attacks" implemented by mal-intended entities.

Unfortunately, these text descriptions can also include information that is not germane to identifying the more important pieces of information (e.g., filler text, insignificant text, etc.). Consequently, a security professional is conventionally requited to manually sort through all the text in the unstructured document to identify and understand the more important pieces of information, and this sorting process is often what causes large delays in mitigating a security issue.

Accordingly, the system described herein is configured to analyze an unstructured document to extract notable security features and efficiently gain an understanding of a context of the security issue and/or a mitigation plan to resolve the security issue. More specifically, the systems receives an unstructured document that includes text provided by multiple different security providers. As described above, and for illustrative purposes, parts or the whole of an unstructured document can include a security finding, an audit, a vulnerability advisory, a threat intelligence report, a risk register, and/or an exception repository. Consequently, text in the unstructured document relates to and/or reveals at least one security issue associated with a set of resources.

The system is configured to apply a model that implements natural language processing techniques to various text segments (e.g., a phrase, a sentence, a paragraph, etc.) included in the unstructured document. The implementation of natural language processing techniques allows the model to identify notable security features. For instance, the model can be trained to map text segments to a linguistic context. In one example, the model uses neural networks to produce word embeddings and to construct the linguistic contexts of text segments used in the unstructured document. In one example, the model (e.g., a "doc2vec" model) can be trained by extracting text segments from a large number (e.g., hundreds, thousands, etc.) of labeled documents that are part of a training data set, and producing a vector space that includes a vector representation for text segments included in the labeled documents. The vector representations can be positioned, in the vector space, so that text segments that are more likely to share common linguistic contexts are located in close proximity to one another. Consequently, the model is configured to map different text segments that may appear in different unstructured documents to the same linguistic context in order to understand a common underlying meaning and to identify notable security features.

This mapping is important due to the widespread nature in which alerts are generated and summarized in various parts of the unstructured document. More specifically, different security providers may use different text to describe the same notable security features. For example, four different alerts generated by four different security providers may provide four different text descriptions that essentially point to the application of "Patch ABC" to help resolve a security issue. As described above, notable security features can include key insights (e.g., a type of security issue), provider intents or recommendations (e.g., a mitigation action), identifications and/or locations of resources affected by the security issues (e.g., a specific resource, a domain, etc.), identifications and/or locations of resources that need to be reconfigured (e.g., updated, modified, etc.) to implement a mitigation plan, identifications and/or locations of entities capable of implementing a mitigation action as part of a mitigation plan, and so forth.

The training data set used to lean the model also includes known mitigation actions taken to implement a mitigation plan to resolve a security issue described by the labeled notable security features in the training documents. Accordingly, the model can also include learned mappings between the notable security features and a prescribed set of mitigation actions. A mitigation action can be one that is revealed via an analysis of an unstructured document, such that a notable security feature provides guidance with respect to the mitigation. Or, a mitigation action can be one to which the model has learned to map a notable security feature.

The system can provide the prescribed set of mitigation actions to an entity responsible for resolving the security issue. The entity may be one that is indicated by a notable security feature identified in the unstructured document. In one example, this entity is a user that can follow the prescribed set of mitigation actions and that has administrative control over resources that need to be reconfigured to resolve the security issue (e.g., update software, apply a security patch, etc.). In another example, this entity may be a machine or system capable of automated processing of the prescribed set of mitigation actions.

In some examples, the model is configured to assign a confidence score to a set of notable security features identified in an unstructured document. The confidence score is indicative of an accuracy level for the identification of the notable security features. This indication may be normalized. For instance, the score can be normalized to a value or percentage between zero and one hundred where, for example, a score of one hundred indicates full confidence that the model correctly identified the notable security features and a score of twenty indicates little confidence that the model correctly identified the notable security features.

In this way, the system can be configured to only pass a prescribed set of mitigation actions on if the system determines that the confidence score exceeds a threshold confidence score. This avoids a situation where the model is not confident in its output, and therefore, may issue an incorrect or incomplete set of mitigation actions. Accordingly, if the confidence score does not exceed the threshold confidence score, the system can pass the unstructured document on to a security professional so the whole document can be manually analyzed and labeled. This labeled document can then become part of the training data set.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses techniques and technologies for minimizing the amount of time it takes to process and understand an unstructured, text-heavy document that includes important security-related information. The system described herein uses a model that implements natural language processing techniques to semantically analyze an unstructured, text-heavy document, in order to identify notable security features useable to resolve the security issues in a more effective and efficient manner (e.g., without the need for a technical security professional). More specifically, the system receives an unstructured document that includes text which may be provided by multiple different security providers. The system is configured to apply the model to various text segments (e.g., a phrase, a sentence, a paragraph, etc.) included in the unstructured document to identify notable security features. The model can then associate the notable security features with a prescribed set of mitigation actions that can be implemented to resolve a security issue.

Various examples, scenarios, and aspects of the disclosed techniques are described below with reference to FIGS. 1-7.

Figure 1:
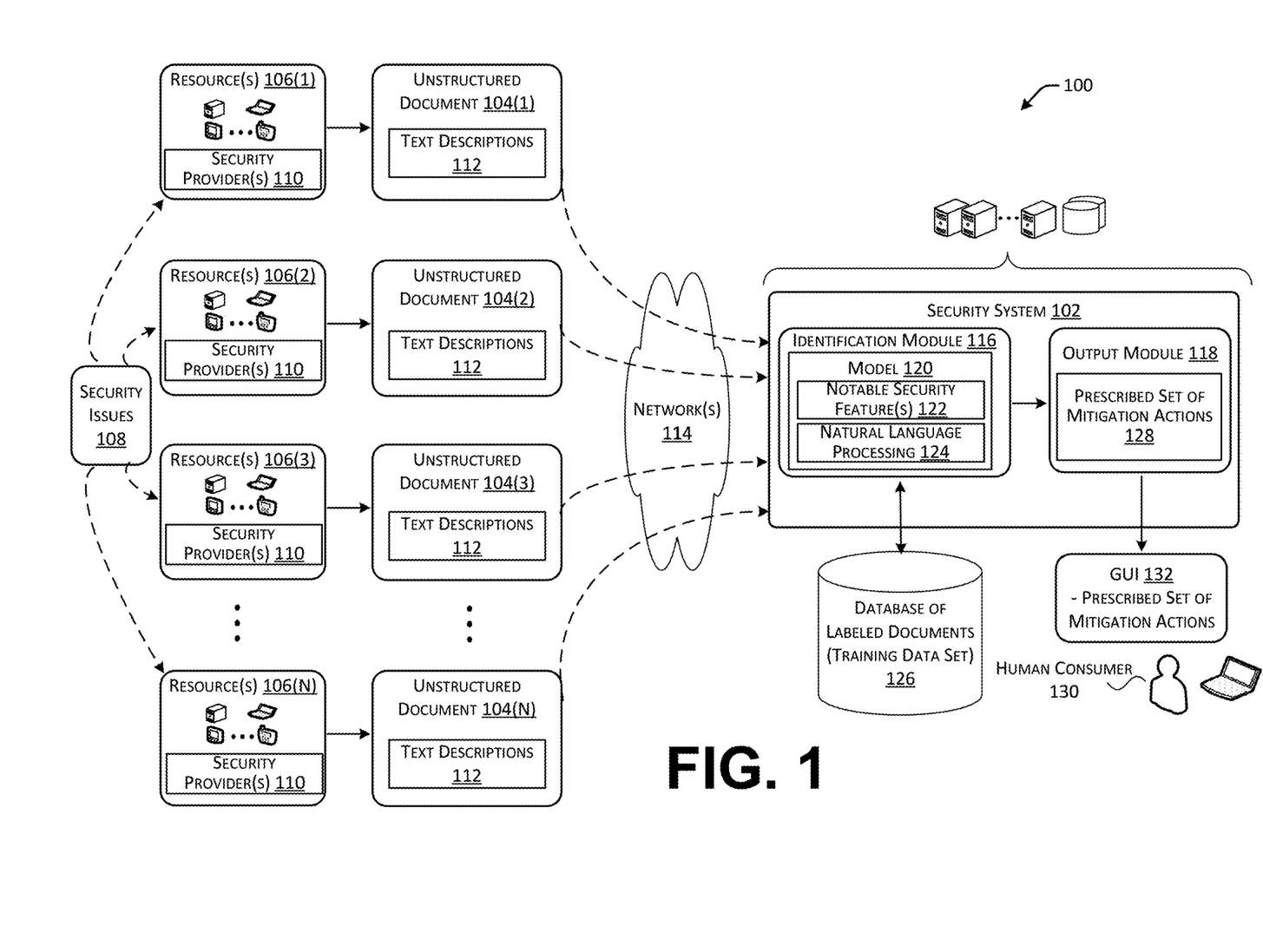
FIG. 1 is a diagram illustrating an example environment in which a security system is configured to analyze an unstructured document to identify notable security features, and to provide a prescribed set of mitigation actions to resolve a security issue associated with the notable security features.

FIG. 1 is a diagram illustrating an example environment 100 in which a security system 102 is configured to analyze unstructured documents 104(1-N) (may be referred to herein as an unstructured document 104), individually received on behalf of different sets or resources 106(1-N), to identify notable security features. Based on the analysis, the security system 102 can provide a prescribed set of mitigation actions to resolve a security issue associated with the notable security features.

FIG. 1 illustrates various resources 106(1-N) (may be referred to herein as a resource 106) that may each experience a security issue 108. In the context of FIG. 1, N is a positive integer number such as four, five, ten, fifty, thousands, millions etc. that represents different sets of resources. A set of resources may be associated with a particular domain implemented by the security system 102 or to be monitored by the security system 102. For example, a domain can comprise a particular group of machines, a particular network, a particular service, a particular platform or sub-platform, a particular organization or customer, etc. In some instances, a resource can be part of multiple different domains.

As described above, a resource can include a server, a storage device, a user device (e.g., a personal computer, a tablet computer, a smartphone, etc.), a virtual machine, a virtual network, networking equipment, an account, and so forth, that is under control of an entity operating the security system 102. Additionally or alternatively, a resource may be one that is configured to be monitored by the security system 102. Accordingly, a resource can be a physical resource or a virtual resource under control of a service provider or a customer of the service provider.

An entity operating the security system 102 may implement different internal security providers, or may contract with external security providers (e.g., security vendors), to secure the resources 106(1-N) and prevent cyberattacks. A security issue 108 can be related to distributed denial of service (DDoS) attacks, the installation of malware, brute force attacks, phishing campaigns, or other types of security-related "attacks" implemented by mal-intended entities.

Accordingly, FIG. 1 illustrates different security providers 110 configured to monitor the resources 106(1-N). The security providers 110 are configured to provide text input to the unstructured documents 104(1-N). This text input can include a security finding, an audit, a vulnerability advisory, a threat intelligence report, a risk register, and/or an exception repository. In various examples, the security providers 110 can provide input to an unstructured document 104 based on an alert. An alert means that an event has been detected. The event can indicate that a resource may be susceptible or exposed to a problem, and therefore, further investigation may be warranted. An alert can be generated automatically by a monitoring system, such as anti-malware software, or other detection mechanisms configured by the security providers 110. In another example, an alert can be generated from external customer reports submitted through a customer portal. Consequently, the security providers 110 can generate an unstructured document 104 in response to one or more security events, or alerts. Alternatively, the security providers 110 can generate an unstructured document 104 in accordance with a schedule. For instance, a security provider 110 can generate and issue a security audit report based on its findings every day, every week, every month, and so forth.

A security provider 110 can generate information, to be included in an unstructured document 104, by way of manual or automated text descriptions 112. Consequently, the unstructured documents 104(1-N) generated for individual sets of resources 106(1-N) typically include a large amount of text describing, in great detail, security information. In many cases, the unstructured document can include up to twenty to thirty pages of text. These text descriptions 112 can include notable pieces of information related to a broader security issue 108. For example, notable pieces of information can be revealed via the use of keywords and/or key phrases. Unfortunately, these text descriptions can also include information that is not germane to identifying the more important pieces of information (e.g., filler text, insignificant text, etc.).

The security system 102 is configured to receive the unstructured documents 104(1-N) over various network(s) 114. The security system 102 can comprise device(s) (e.g., servers, etc.) and/or other components that communicate with one another with and/or with the resources 106(1-N) via network(s) 114. Moreover, the security system 102 can include an identification module 116 and an output module 118. The number of illustrated modules is just an example, and the number can vary higher or lower. That is, functionality described herein in association with the illustrated modules can be performed by a fewer number of modules or a larger number of modules on one device or spread across multiple devices.

The identification module 116 is configured to employ a model 120 to analyze an unstructured document 104, received for a set of resources 106, and to extract notable security features 122. The notable security features 122 can include key insights (e.g., a type of security issue), provider intents or recommendations (e.g., a mitigation action), identifications and/or locations of resources affected by the security issues (e.g., a specific resource, a domain or division of resources in which the security issue occurs, etc.), identifications and/or locations of resources that need to be reconfigured (e.g., updated, modified, etc.) to implement a mitigation plan, identifications and/or locations of entities capable of implementing a mitigation action as part of a mitigation plan, and so forth. The notable security features 122 are important pieces of information one tasked with resolving a security issue 108 needs to "take away" from the unstructured document 104, so that the context of the security issue 108 can be fully understood and mitigated. A number of these notable security features 122 is typically limited for an unstructured document 104. That is, in most instances, one should take away somewhere between five and fifteen notable security features. However, some documents may include more or less notable security features.

Unfortunately, it is difficult for someone to manually identify these notable security features due to the large amounts of text in the unstructured documents 104. To address this problem, the model 120 is configured to implement natural language processing techniques 124 on various text segments (e.g., a phrase, a sentence, a paragraph, etc.) included in the unstructured document 104 to identify the notable security features 122. Using the natural language processing techniques 124, the model 120 is trained to map text segments to a linguistic context. In one example, the model 120 uses neural networks to produce word embeddings and to construct the linguistic contexts of text segments used in the unstructured document 104. The model 120 can be trained by extracting text segments from a large number (e.g., hundreds, thousands, etc.) of labeled documents 126 that are part of a training data set accessible via a database, and producing a vector space that includes a vector representation for text segments included in the labeled documents 126. The vector representations are positioned, in the vector space, so that text segments that are more likely to share common linguistic contexts are located in close proximity to one another. Consequently, the model 120 is configured to map different text segments using different words and phrases to the same linguistic context in order to understand the underlying meaning and to identify notable security features 122.

As described above, this mapping is important due to the widespread nature in which alerts are generated and summarized in the text descriptions 112 of the unstructured documents 104(1-N). More specifically, the security providers 110 may use different text to describe the same notable security features. For example, four different alerts generated by four different security providers 110 may provide four different text descriptions that essentially point to the application of "Patch ABC" to help resolve a security issue 108.

The training data set used to lean the model 120 also includes known mitigation actions taken to implement a mitigation plan to resolve a security issue described by the notable security features in the labeled documents 124. Accordingly, the model 120 can also include learned mappings between the notable security features 122 and a prescribed set of mitigation actions 128. A mitigation action can be one that is revealed via an analysis of an unstructured document 104, such that a notable security feature 122 provides guidance with respect to the mitigation. Or, a mitigation action can be one to which the model 120 has learned to map a notable security feature 122.

The model 120 can provide the prescribed set of mitigation actions 128 to an entity responsible for resolving the security issue. The entity may be one that is indicated by a notable security feature 122 identified in the unstructured document 104. In one example, this entity is a human consumer 130 that can follow the prescribed set of mitigation actions 128 and that has administrative control over resources that need to be reconfigured to resolve the security issue (e.g., update software, apply a security patch, etc.). For instance, the prescribed set of mitigation actions 128 can be displayed to the human consumer 130 via a graphical user interface 132. In another example, this entity may be a machine or system capable of automated processing of the prescribed set of mitigation actions 128.

In various examples, device(s) of the security system 102 can include one or more computing devices that operate in a cluster or other grouped configuration to share resources, balance load, increase performance, provide fail-over support or redundancy, or for other purposes. For instance, device(s) of a security system 102 can belong to a variety of classes of devices such as server-type devices, desktop computer-type devices, mobile-type devices, special purpose-type devices, embedded-type devices, and/or wearable-type devices. A client device used by a human consumer 128 can include, but is not limited to, a desktop computer, a game console and/or a gaming device, a tablet computer, a personal data assistant (PDA), a mobile phone/tablet hybrid, a laptop computer, a telecommunication device, a wearable device, a work station, or any other sort of computing device.

Network(s) 114 can include, for example, public networks such as the Internet, private networks such as an institutional and/or personal intranet, or some combination of private and public networks. Network(s) 114 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 114 can utilize communications protocols, including packet-based and/or datagram-based protocols such as internet protocol (IP), transmission control protocol (TCP), user datagram protocol (UDP), or other types of protocols. Moreover, network(s) 114 can also include a number of devices that facilitate network communications and/or form a hardware basis for the networks, such as switches, routers, gateways, access points, firewalls, base stations, repeaters, backbone devices, and the like.

Figure 2:
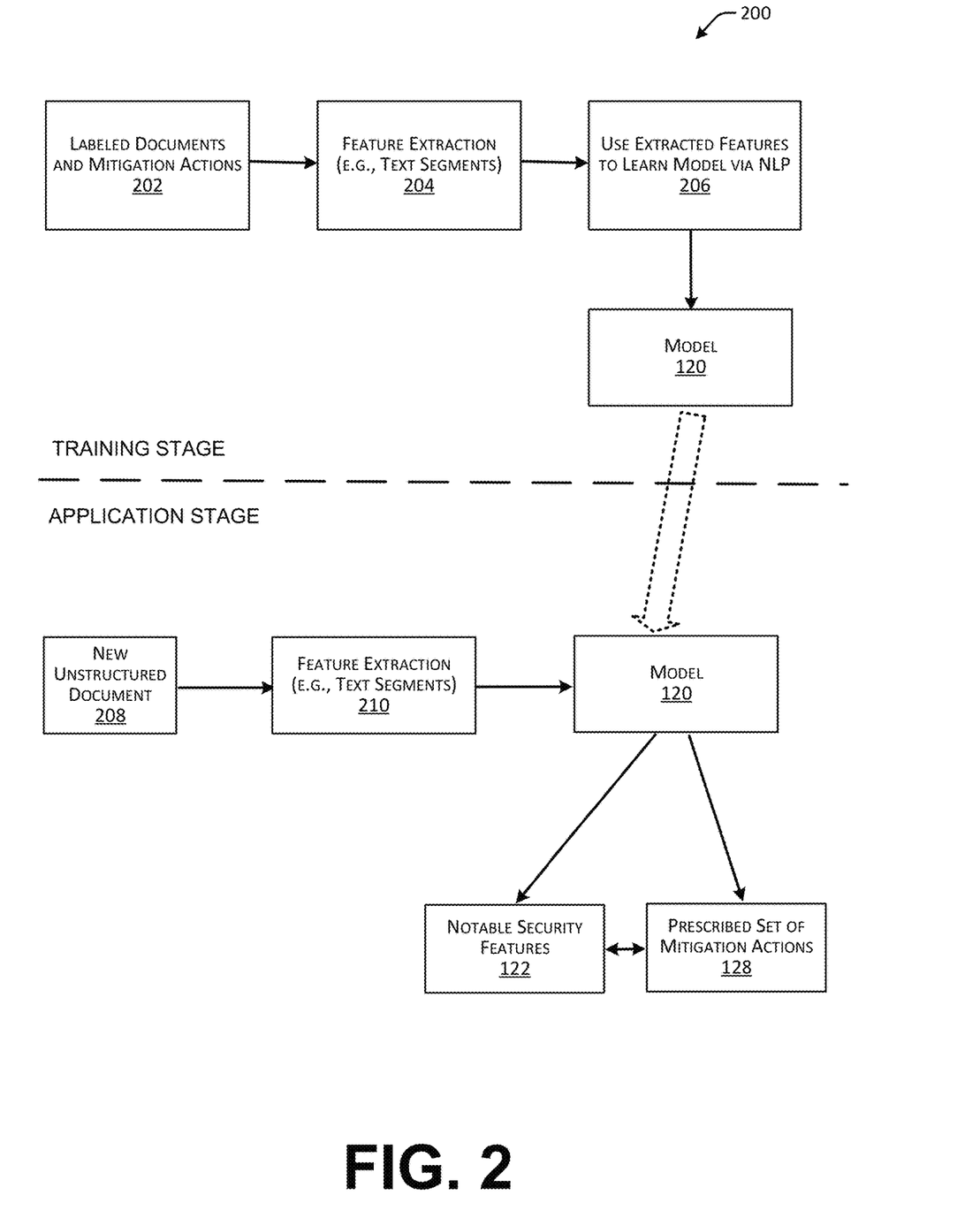
FIG. 2 is a block diagram illustrating a training stage and an application stage for a model used to identify notable security features in an unstructured document and map the notable security features to a prescribed set of mitigation actions.

FIG. 2 is a block diagram 200 illustrating a training stage and an application stage for an a model 120 used to identify notable security features in an unstructured document, and to map the notable security features to a prescribed set of mitigation actions. During the training stage, the model 120 can be learned using labeled documents (e.g., labeled text that indicates a notable security issue) and known mitigation actions 202 that were recommended by a security professional and/or that actually performed to resolve security issues represented in the labeled documents. The identification module 116 is configured to perform feature extraction 204 (e.g., text segments) on the text and use the extracted features to learn the model 120 via natural language processing (NLP) 206.

As described above, the model 120 may be trained to map the words used in a text segment to a linguistic context. In one example, the model 120 (e.g., a "doc2vec" model) may use neural networks to produce word embeddings and to construct the linguistic contexts of the words used in the text segments. The model 120 can produce a vector space that includes a vector representation for the words used in a text segment. The vector representations are positioned, in the vector space, so that text segments that are more likely to share common linguistic contexts are located in close proximity to one another. Consequently, the model 120 is configured to map different text segments to the same linguistic context or underlying meaning.

After the training stage is complete, the model 120 can be used in the application stage to perform the task of identifying notable security features and/or mapping the notable security features to a prescribed set of mitigation actions. That is, provided a new unstructured document 208, the identification module 116 implements feature extraction 210 (e.g., text segments) on the new unstructured document 208 and applies the model 120 in order to map text segments to a linguistic context (e.g., via the generation of a vector representation for the words used in the text segments and the insertion of the vector representation into the vector space). Accordingly, the model 120 can associate the text segments with notable security features 122. Moreover, the model 120 can associate the notable security features 122 with a prescribed set of mitigation actions 128.

Figure 3:
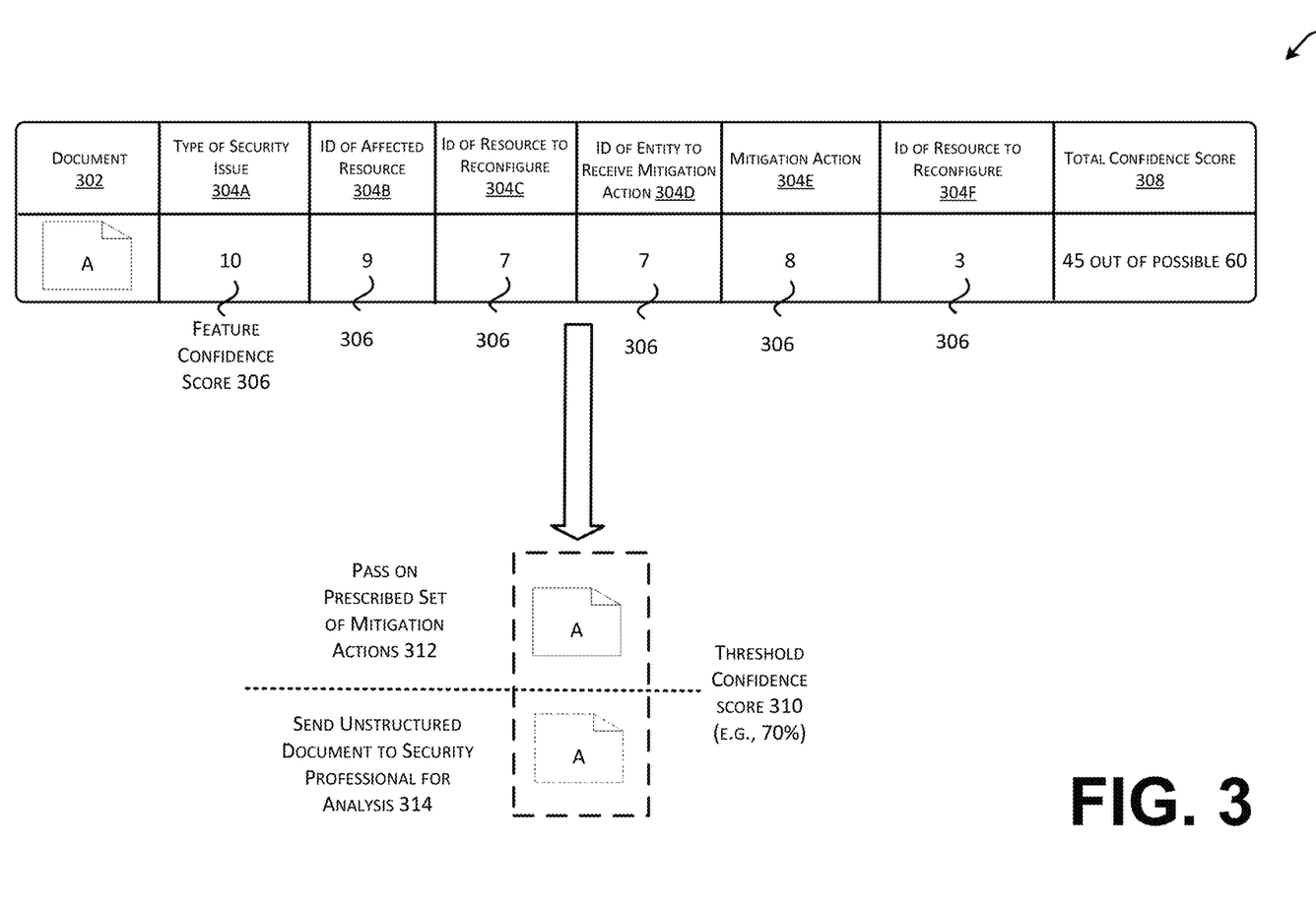
FIG. 3 is a diagram illustrating how a confidence score associated with an analyzed unstructured document can be used to determine how the analyzed unstructured document is further processed.

FIG. 3 is a diagram 300 illustrating how a confidence score associated with an analyzed unstructured document can be used to determine how the analyzed unstructured document is further processed. In various examples, the model 120 is configured to assign a confidence score to a set of notable security features identified in an unstructured document A 302 (e.g., unstructured document 104). The confidence score is indicative of an accuracy level for the identification of the notable security features.

To illustrate, FIG. 3 shows that an application of model 102 to unstructured document A 302 has resulted in the identification of notable security features 304(A-F). That is, notable security feature 304A indicates a type of security issue. Notable security feature 304B indicates an identification of an affected or impacted resource. Notable security feature 304C indicates an identification of a resource to be reconfigured. Notable security feature 304D indicates an identification of an entity to receive a mitigation action in the prescribed set of mitigations actions. Notable security feature 304E indicates a specific mitigation action to be included in the prescribed set of mitigation actions. And notable security feature 304F indicates an identification of another resource to be reconfigured.

The model 120 is configured to determine a feature confidence score 306 for each of the notable security features 304(A-F). In this example, the feature confidence scores 306 are a value between one and ten. The model 120 can determine the feature confidence scores 306 based on a degree to which a text segment is similar to other text segments known to be associated with a linguistic context. As shown, notable security feature 304A has a feature confidence score of ten indicating maximum confidence in its identification. Notable security feature 304B has a feature confidence score of nine indicating extreme confidence in its identification. Notable security feature 304C has a feature confidence score of seven indicating high confidence in its identification. Notable security feature 304D also has a feature confidence score of seven indicating high confidence in its identification. Notable security feature 304E has a feature confidence score of eight indicating high confidence in its identification. And notable security feature 304F has a feature confidence score of three indicating low confidence in its identification.

In this example, the model 120 is configured to determine a total confidence score 308 based on a sum of the individual feature confidence scores 306. The total confidence score 308 is forty-five out of a possible of sixty. This confidence score 308 may be normalized, e.g., to a value of 75%.

In this way, the model 120 can use a threshold confidence score 310 (e.g., 70%) to determine whether the prescribed set of mitigation actions should be passed on to an entity (e.g., a human consumer or customer) to resolve the security issue. That is, the model 120 can determine that the confidence score 308 (e.g., 75%) exceeds a threshold confidence score 310 (e.g., 70%) prior to passing on the prescribed set of mitigation actions to the entity 312. This avoids a situation where the model 120 is not confident in its output, and therefore, may issue an incorrect or incomplete set of mitigation actions. In various examples, when the prescribed set of mitigation actions is passed on to the entity, a mitigation action associated with a notable security feature 304F identified with low confidence can be revealed to the entity.

In contrast, if the confidence score 308 does not exceed the threshold confidence score 310 (which is not the case in the example of FIG. 3), the model 120 can pass the unstructured document A 302 on to a security professional so the whole document can be manually analyzed and labeled 314. This labeled document can then become part of the training data set.

Figure 4:
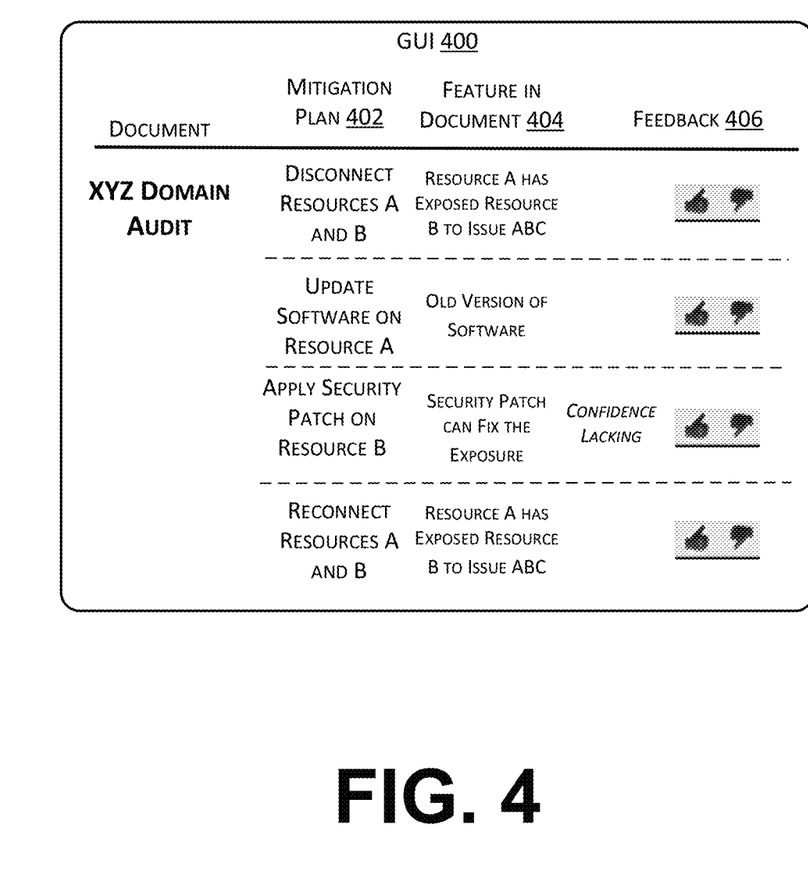
FIG. 4 is an example graphical user interface illustrating information that can be displayed to an entity tasked with resolving a security issue.

FIG. 4 is an example graphical user interface 400 illustrating information that can be displayed to an entity (e.g., the human consumer 130) tasked with resolving a security issue. The information can include an identification of the unstructured document (e.g., the "XYZ Domain Audit"). Furthermore, the information can include a mitigation plan 402 that lists the prescribed set of mitigation actions. In some examples, the information can also include an explanation of how a mitigation action is associated with one or more of the notable security features identified in the document 404.

As shown, a first mitigation action to disconnect Resources A and B is associated with a notable security feature that indicates Resource A has exposed Resource B to Issue ABC. A second mitigation action to update software on Resource A is associated with a notable security feature that indicates Resource A is executing an old version of the software. A third mitigation action to apply a security patch on Resource B is associated with a notable security feature that indicates the security patch can fix the exposure. Note that this mitigation action and notable security feature includes an indication or notification that "confidence is lacking". As described above, such an indication can be provided for an individual mitigation action when the model 120 is not confident in the identification of the individual notable security feature (e.g., the individual security feature score is less than an individual security feature score threshold), but the model is otherwise confident in the identification of other notable security features. Finally, a fourth mitigation action to reconnect Resources A and B is associated with the notable security feature that indicates Resource A has exposed Resource B to Issue ABC.

The above examples and explanations are provided at a high level for simplicity. However, it is understood in the context of this document, that mitigation actions and notable security features may be more specific and technical, with a strong emphasis on security-related information.

In various examples, the graphical user interface 400 can also be configured to present an option for the human consumer to provide feedback 406 indicating whether a mitigation action is effective. For example, upon a cursory review of the displayed information and/or tangible steps taken to implement a mitigation action, the human consumer can provide an indication, via a selection of the thumbs-up option or a selection of the thumbs-down option, of whether the mitigation action was likely successful. Acquiring this feedback 406 enables a supervised learning approach that can improve the model 120 using labels that continue to be collected over time.

Figure 5:
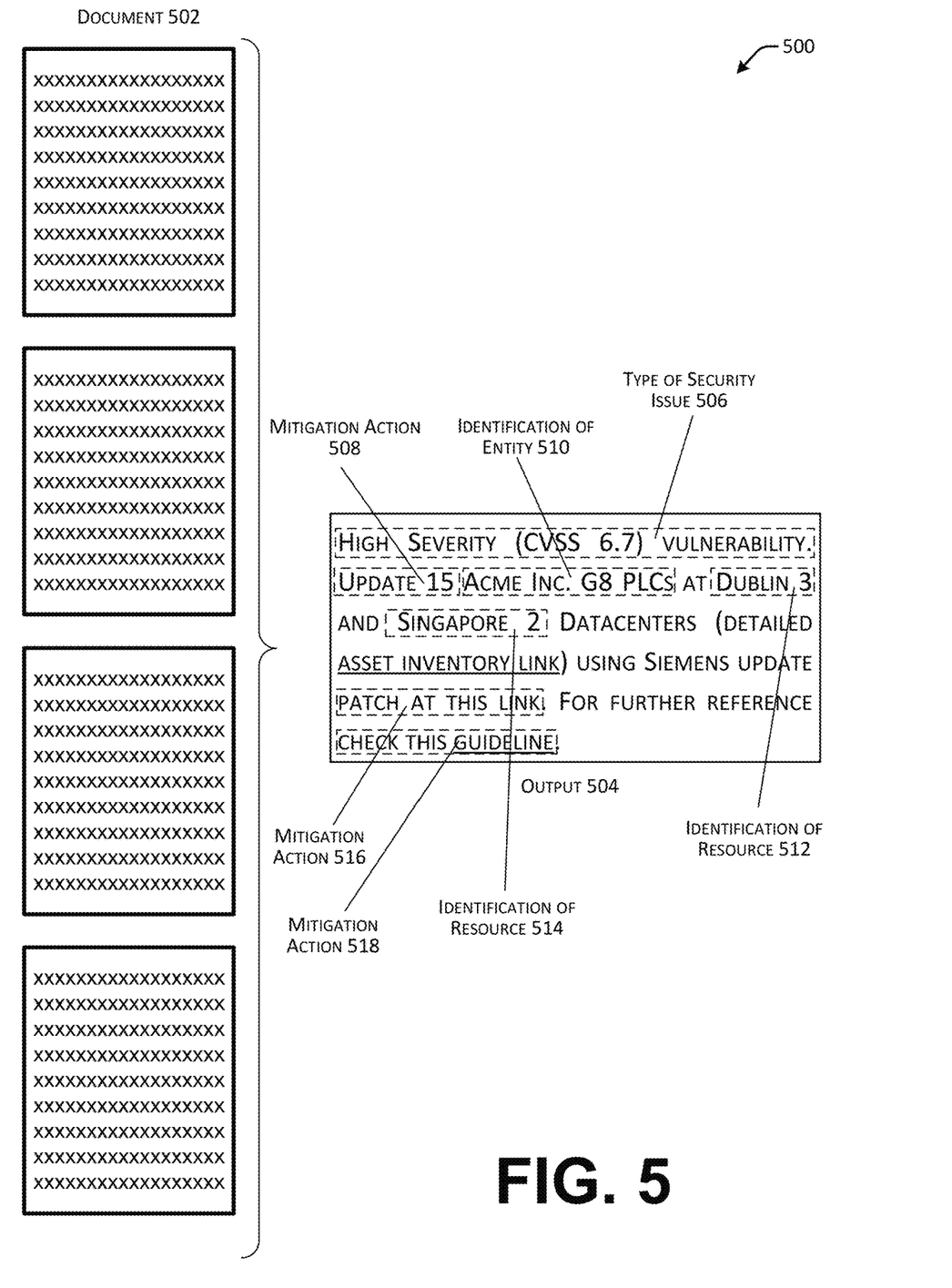
FIG. 5 is a diagram illustrating an output of notable security features identified by a model that implements natural language processing techniques.

FIG. 5 is a diagram 500 illustrating an output of notable security features identified by a model 120 that implements natural language processing techniques. As illustrated, an unstructured document 502 (e.g., unstructured document 104) can include multiple pages of heavy text (e.g., only four pages are illustrated in this example). When applied, the model 120 applies natural language processing 124 to the heavy text and the output 504 is a set of identified notable security features 122.

In the example of FIG. 5, the notable security features 122 extracted from the multiple pages amount to an output 504 that indicates "High Severity (CVSS 6.7) vulnerability. Update 15. Acme Inc. G8 PLCs at Dublin 3 and Singapore 2 Datacenters (detailed MS asset inventory link) using Siemens update patch at this link. For further reference check this guideline."

A first notable security feature can identify the type of security issue 506 (e.g., "High Severity (CVSS 6.7) Vulnerability"). A second notable security feature can identify a mitigation action 508 (e.g., "update"). A third notable security feature can identify an entity to which at least some mitigation actions are to be sent 510 (e.g., "Acme Inc. G8 PLCs"). A fourth notable security feature can identify a resource affected by a security issue and/or a resource that needs to be reconfigured to resolve the security issue 512 (e.g., "Dublin 3"). A fifth notable security feature can identify another resource affected by a security issue and/or a resource that needs to be reconfigured to resolve the security issue 514 (e.g., "Singapore 2"). A sixth notable security feature can identify another mitigation action 516 (e.g., "patch at this link"). And a seventh notable security feature can identify yet another mitigation action 518 (e.g., "check this guideline").

Consequently, the techniques described herein bridge the time gap by utilizing a trained model that implements natural language processing techniques to analyze an unstructured, text-heavy document, in order to identify notable security features useable to resolve a broader security issue in a more effective and efficient manner (e.g., without the need for a technical security professional). To allow for this, the model can map the notable security features to a set of prescribed mitigation actions, and display the prescribed mitigation actions to an entity capable of resolving the security issue.

Figure 6:
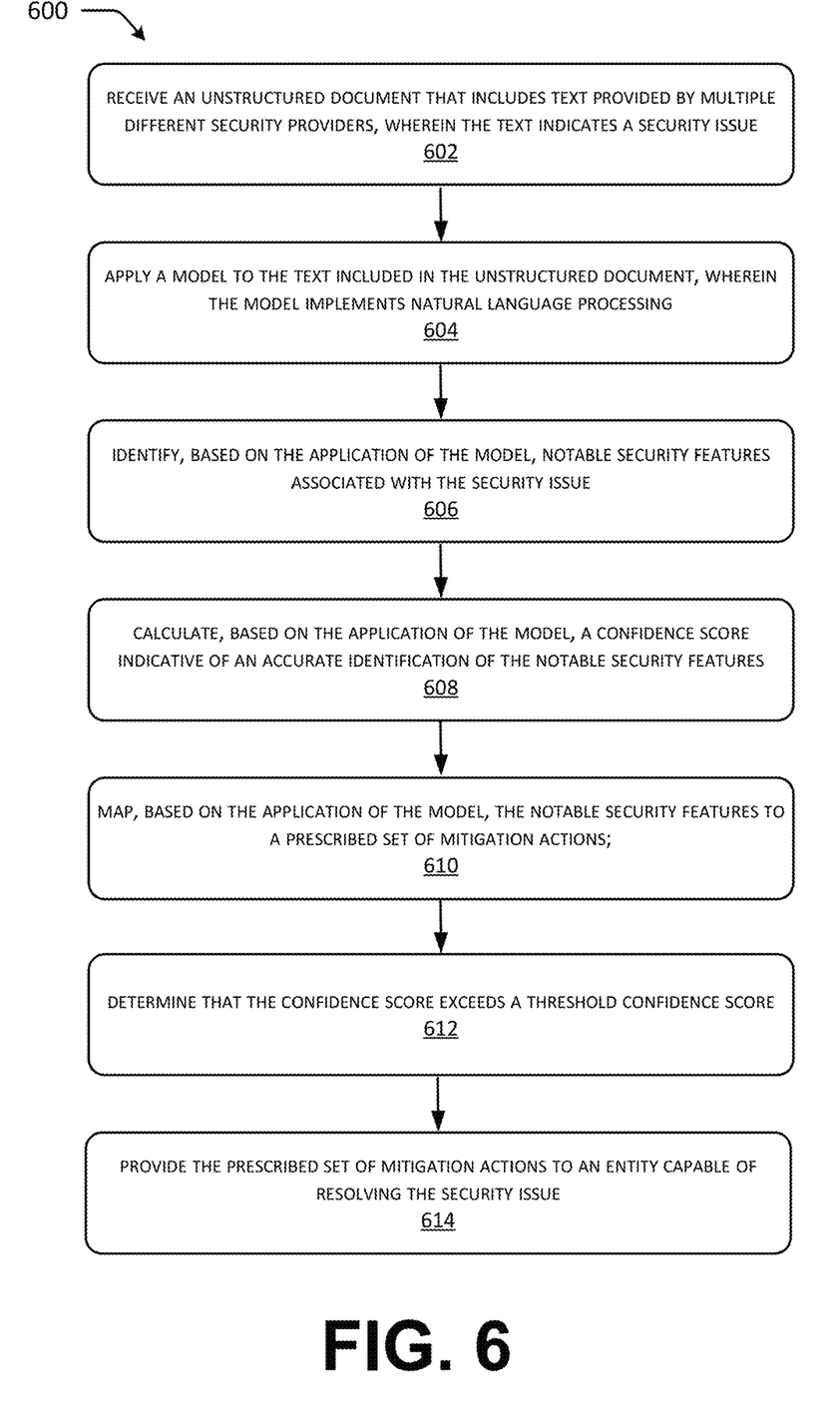
FIG. 6 is a flow diagram of an example method for analyzing an unstructured document to identify notable security features and providing a prescribed set of mitigation actions to resolve a security issue associated with the notable security features.

FIG. 6 represents an example process in accordance with various examples from the description of FIGS. 1-5. The example operations shown in FIG. 6 can be implemented on or otherwise embodied in one or more device(s) of the security system 102.

The order in which the operations are described is not intended to be construed as a limitation, and any number of the described operations can be combined in any order and/or in parallel to implement each process. Moreover, the operations in FIG. 6 can be implemented in hardware, software, and/or a combination thereof. In the context of software, the operations represent computer-executable instructions that, when executed by one or more processing units, cause one or more processing units to perform the recited operations. For example, modules and other components described herein can be stored in a computer-readable media and executed by at least one processing unit to perform the described operations.

FIG. 6 is a flow diagram of an example method 600 for analyzing an unstructured document to identify notable security features and providing a prescribed set of mitigation actions to resolve a security issue associated with the notable security features.

At operation 602, an unstructured document that includes text provided by multiple different security providers is received. As described above, the text indicates a security issue.

At operation 604, a model that implements natural language processing is applied to the text included in the unstructured document.

At operation 606, notable security features associated with the security issue are identified identify based on the application of the model.

At operation 608, a confidence score indicative of an accurate identification of the notable security features may be calculated based on the application of the model.

At operation 610, the notable security features are mapped to a prescribed set of mitigation actions based on the application of the model.

At operation 612, it is determined that the confidence score exceeds a threshold confidence score.

At operation 614, based on the determination that the confidence score exceeds the threshold confidence score, the prescribed set of mitigation actions is provided to an entity capable of resolving the security issue.

Figure 7:
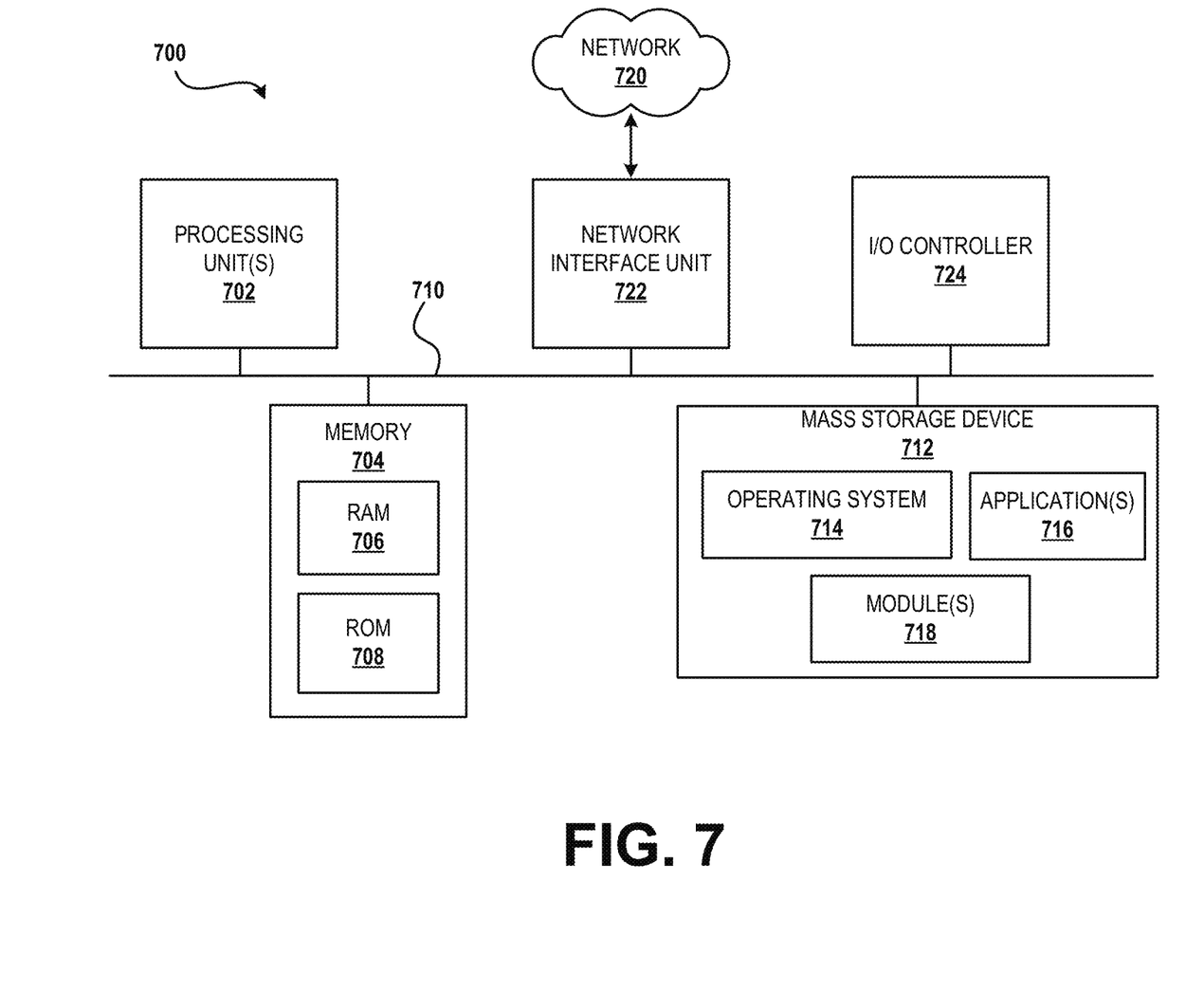
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server configured as part of the security system 102, capable of executing computer instructions (e.g., a module or a program component described herein). The computer architecture 700 illustrated in FIG. 7 includes processing unit(s) 702, a system memory 704, including a random access memory 706 ("RAM") and a read-only memory ("ROM") 708, and a system bus 710 that couples the memory 704 to the processing unit(s) 702.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718 (e.g., the identification module 116 and the output module 118), and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

The disclosure presented herein also encompasses the subject matter set forth in the following clauses.

Example Clause A, a system comprising: one or more processing units; and a computer-readable storage medium having computer-executable instructions stored thereupon, which, when executed by the one or more processing units, cause the one or more processing units to: receive an unstructured document that includes text provided by multiple different security providers, wherein the text indicates at least one security issue; apply a model to the text included in the unstructured document, wherein the model implements natural language processing; identify, based on the application of the model, notable security features associated with the at least one security issue; calculate, based on the application of the model, a confidence score indicative of an accurate identification of the notable security features; map, based on the application of the model, the notable security features to a prescribed set of mitigation actions; determine that the confidence score exceeds a threshold confidence score; and based on the determination that the confidence score exceeds the threshold confidence score, provide the prescribed set of mitigation actions to at least one entity capable of resolving the at least one security issue.

Example Clause B, the system of Example Clause A, wherein an individual notable security feature comprises a type of the at least one security issue.

Example Clause C, the system of Example Clause A or Example Clause B, wherein an individual notable security feature comprises an identification or a location of a resource affected by the at least one security issue.

Example Clause D, the system of any one of Example Clauses A through C, wherein an individual notable security feature comprises an identification or a location of a resource to be reconfigured to resolve the at least one security issue.

Example Clause E, the system of any one of Example Clauses A through D, wherein an individual notable security feature comprises an identification of the entity.

Example Clause F, the system of any one of Example Clauses A through E, wherein an individual notable security feature comprises a specified mitigation action to be included in the prescribed set of mitigation actions.

Example Clause G, the system of any one of Example Clauses A through F, wherein the unstructured document comprises text descriptions that represent at least one of a security finding, an audit, a vulnerability advisory, a threat intelligence report, a risk register, or an exception repository.

Example Clause H, the system of any one of Example Clauses A through G, wherein the computer-executable instructions further cause the one or more processing units to: receive, as part of a training data set, a plurality of labeled documents and mitigation actions that were recommended or performed to resolve security issues indicated in the plurality of labeled documents; and learn, as part of the model and using the training data set, (i) a mapping between one or more text segments and an individual notable security features and (ii) a mapping between the individual notable security feature and one or more mitigation actions to be included in the prescribed set of mitigation actions.

Example Clause I, a method comprising: receiving an unstructured document that includes text provided by multiple different security providers, wherein the text indicates at least one security issue; applying, by one or more processing units, a model to the text included in the unstructured document, wherein the model implements natural language processing; identifying, based on the application of the model, notable security features associated with the at least one security issue; mapping, based on the application of the model, the notable security features to a prescribed set of mitigation actions; and providing the prescribed set of mitigation actions to at least one entity capable of resolving the at least one security issue.

Example Clause J, the method of Example Clause I, further comprising: calculating, based on the application of the model, a confidence score indicative of an accurate identification of the notable security features; and determining that the confidence score exceeds a threshold confidence score, wherein the provision of the prescribed set of mitigation actions to the at least one entity capable of resolving the at least one security issue is implemented based on the determination that the confidence score exceeds the threshold confidence score.

Example Clause K, the method of Example Clause I or Example Clause J, wherein an individual notable security feature comprises a type of the at least one security issue.

Example Clause L, the method of any one of Example Clauses I through K, wherein an individual notable security feature comprises an identification or a location of a resource affected by the at least one security issue.

Example Clause M, the method of any one of Example Clauses I through L, wherein an individual notable security feature comprises an identification or a location of a resource to be reconfigured to resolve the at least one security issue.

Example Clause N, the method of any one of Example Clauses I through M, wherein an individual notable security feature comprises an identification of the entity.

Example Clause O, the method of any one of Example Clauses I through N, wherein an individual notable security feature comprises a specified mitigation action to be included in the prescribed set of mitigation actions.

Example Clause P, the method of any one of Example Clauses I through O, wherein the unstructured document comprises text descriptions that represent at least one of a security finding, an audit, a vulnerability advisory, a threat intelligence report, a risk register, or an exception repository.

Example Clause Q, the method of any one of Example Clauses I through P, further comprising: receiving, as part of a training data set, a plurality of labeled documents and mitigation actions that were recommended or performed to resolve security issues indicated in the plurality of labeled documents; and learning, as part of the model and using the training data set, (i) a mapping between one or more text segments and an individual notable security features and (ii) a mapping between the individual notable security feature and one or more mitigation actions to be included in the prescribed set of mitigation actions.

Example Clause R, one or more computer storage media having instructions that, when executed by one or more processing units, cause a system to perform operations comprising: receiving an unstructured document that includes text provided by multiple different security providers, wherein the text indicates at least one security issue; applying a model to the text included in the unstructured document, wherein the model implements natural language processing; identifying, based on the application of the model, notable security features associated with the at least one security issue, wherein an individual notable security feature comprises at least one of: an identification or a location of a resource affected by the at least one security issue, an identification of an entity capable of resolving the at least one security issue, or a specified mitigation action to be included in the prescribed set of mitigation actions; mapping, based on the application of the model, the notable security features to a prescribed set of mitigation actions; and providing the prescribed set of mitigation actions to the entity capable of resolving the at least one security issue.

Example Clause S, the one or more computer storage media of Example Clause R, wherein the operations further comprise: calculating, based on the application of the model, a confidence score indicative of an accurate identification of the notable security features; and determining that the confidence score exceeds a threshold confidence score, wherein the provision of the prescribed set of mitigation actions to the at least one entity capable of resolving the at least one security issue is implemented based on the determination that the confidence score exceeds the threshold confidence score.

Example Clause T, the one or more computer storage media of Example Clause R or Example Clause S, wherein the operations further comprise: receiving, as part of a training data set, a plurality of labeled documents and mitigation actions that were recommended or performed to resolve security issues indicated in the plurality of labeled documents; and learning, as part of the model and using the training data set, (i) a mapping between one or more text segments and an individual notable security features and (ii) a mapping between the individual notable security feature and one or more mitigation actions to be included in the prescribed set of mitigation actions.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different resources, two different features, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A system comprising:
   one or more processing units; and
   a computer-readable storage medium having computer-executable instructions stored thereupon, which, when executed by the one or more processing units, cause the one or more processing units to:
   receive, as part of a training data set, a plurality of labeled documents and mitigation actions that were recommended or performed to resolve a security issue indicated in the plurality of labeled documents;
   learn, for a model that implements natural language processing and using the training data set, (i) a mapping between one or more text segments and an individual notable security feature and (ii) a mapping between the individual notable security feature and a mitigation action;
   receive an unstructured document that includes text provided by multiple different security providers, wherein the text included in the unstructured document indicates the security issue via multiple different alerts generated by the multiple different security providers based on at least one detected event;
   apply the model to the text included in the unstructured document;
   identify, based on the application of the model, notable security features associated with the security issue;
   calculate, based on the application of the model, a confidence score indicative of an accurate identification of the notable security features;
   map, based on the application of the model, the notable security features to a prescribed set of mitigation actions;
   determine that the confidence score exceeds a threshold confidence score; and
   based on the determination that the confidence score exceeds the threshold confidence score, provide the prescribed set of mitigation actions to at least one entity capable of resolving the at least one security issue.

2. The system of claim 1, wherein an individual notable security feature comprises a type of the security issue.

3. The system of claim 1, wherein an individual notable security feature comprises an identification or a location of a resource affected by the security issue.

4. The system of claim 1, wherein an individual notable security feature comprises an identification or a location of a resource to be reconfigured to resolve the security issue.

5. The system of claim 1, wherein an individual notable security feature comprises an identification of the entity.

6. The system of claim 1, wherein an individual notable security feature comprises a specified mitigation action to be included in the prescribed set of mitigation actions.

7. The system of claim 1, wherein the unstructured document comprises text descriptions that represent at least one of a security finding, an audit, a vulnerability advisory, a threat intelligence report, a risk register, or an exception repository.

8. A method comprising:
   receiving, as part of a training data set, a plurality of labeled documents and mitigation actions that were recommended or performed to resolve a security issue indicated in the plurality of labeled documents;
   learning, for a model that implements natural language processing and using the training data set, (i) a mapping between one or more text segments and an individual notable security feature and (ii) a mapping between the individual notable security feature and a mitigation action;
   receiving an unstructured document that includes text provided by multiple different security providers, wherein the text included in the unstructured document indicates the security issue via multiple different alerts generated by the multiple different security providers based on at least one detected event;
   applying, by one or more processing units, the model to the text included in the unstructured document;
   identifying, based on the application of the model, notable security features associated with the security issue;
   mapping, based on the application of the model, the notable security features to a prescribed set of mitigation actions; and
   providing the prescribed set of mitigation actions to at least one entity capable of resolving the security issue.

9. The method of claim 8, further comprising:
   calculating, based on the application of the model, a confidence score indicative of an accurate identification of the notable security features; and
   determining that the confidence score exceeds a threshold confidence score, wherein the provision of the prescribed set of mitigation actions to the at least one entity capable of resolving the security issue is implemented based on the determination that the confidence score exceeds the threshold confidence score.

10. The method of claim 8, wherein an individual notable security feature comprises a type of the security issue.

11. The method of claim 8, wherein an individual notable security feature comprises an identification or a location of a resource affected by the security issue.

12. The method of claim 8, wherein an individual notable security feature comprises an identification or a location of a resource to be reconfigured to resolve the security issue.

13. The method of claim 8, wherein an individual notable security feature comprises an identification of the entity.

14. The method of claim 8, wherein an individual notable security feature comprises a specified mitigation action to be included in the prescribed set of mitigation actions.

15. The method of claim 8, wherein the unstructured document comprises text descriptions that represent at least one of a security finding, an audit, a vulnerability advisory, a threat intelligence report, a risk register, or an exception repository.

16. One or more computer storage media having instructions that, when executed by one or more processing units, cause a system to perform operations comprising:
   receiving, as part of a training data set, a plurality of labeled documents and mitigation actions that were recommended or performed to resolve a security issue indicated in the plurality of labeled documents;
   learning, for a model that implements natural language processing and using the training data set, (i) a mapping between one or more text segments and an individual notable security feature and (ii) a mapping between the individual notable security feature and a mitigation action;
   receiving an unstructured document that includes text provided by multiple different security providers, wherein the text included in the unstructured document indicates at least one the security issue via multiple different alerts generated by the multiple different security providers based on at least one detected event;
   applying the model to the text included in the unstructured document;
   identifying, based on the application of the model, notable security features associated with the security issue, wherein an individual notable security feature comprises at least one of: an identification or a location of a resource affected by the security issue, an identification of an entity capable of resolving the security issue, or a specified mitigation action to be included in a prescribed set of mitigation actions;
   mapping, based on the application of the model, the notable security features to the prescribed set of mitigation actions; and
   providing the prescribed set of mitigation actions to the entity capable of resolving the security issue.

17. The one or more computer storage media of claim 16, wherein the operations further comprise:
   calculating, based on the application of the model, a confidence score indicative of an accurate identification of the notable security features; and
   determining that the confidence score exceeds a threshold confidence score, wherein the provision of the prescribed set of mitigation actions to the at least one entity capable of resolving the security issue is implemented based on the determination that the confidence score exceeds the threshold confidence score.

* * * * *